United States Patent Office 3,465,442
Patented Sept. 9, 1969

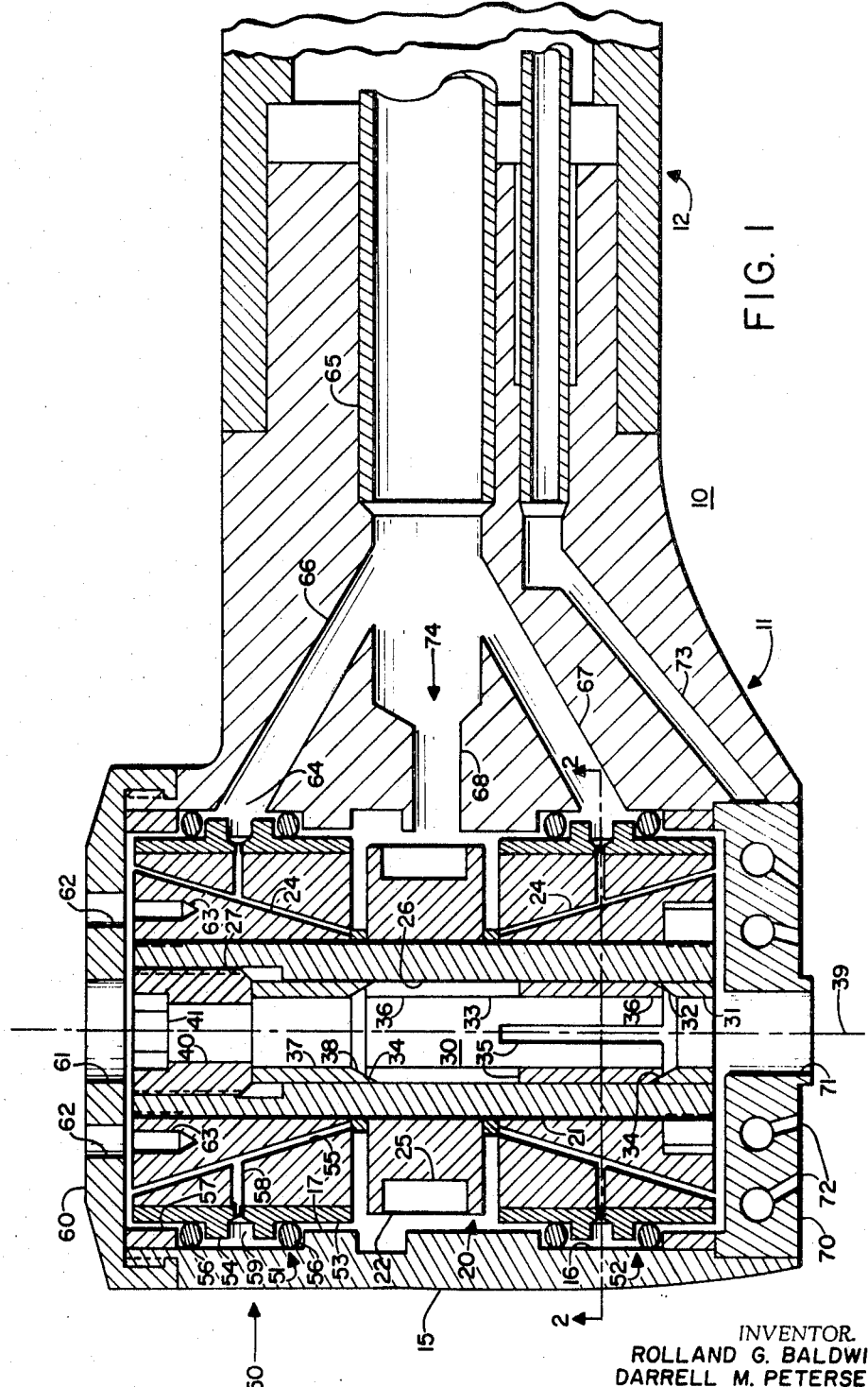

3,465,442
DENTAL HANDPIECE
Rolland G. Baldwin and Darrell M. Petersen, Minneapolis, Minn., assignors to Honeywell Inc., Minneapolis, Minn., a corporation of Delaware
Filed Feb. 27, 1967, Ser. No. 618,645
Int. Cl. A61c 1/05
U.S. Cl. 32—27      3 Claims

ABSTRACT OF THE DISCLOSURE

This application discloses an extremely high-speed dental handpiece which is capable of operation at speeds exceeding 500,000 r.p.m. This high speed is obtained by utilizing a fluid driven rotor supported by a conical hydrostatic bearing means. The bearing means are designed to allow both limited axial and limited transverse movement so as to permit operation during severe loading of the dental burr. Collet means are provided to secure the burr in the rotor for high-speed rotation therewith.

BACKGROUND OF INVENTION

This invention pertains to fluid motors of the rotary tool-driving type utilizing peripheral supply.

Fluid driven dental handpieces utilizing air bearings are old in the prior art. However, the prior art handpieces cannot provide sufficient rotor speed and rotor torque for optimum operation. Higher rotor speed is required for satisfactory bulk removal rates. Higher torque is required in order to drive the rotor to operating speed without undue delay. In addition, the prior art handpieces cannot be subjected to sterilization without adverse effects thereon. The prior art handpieces have an objectionably large head size which obstructs the dentist's view. Prior art collet designs are too bulky to fit within the existing space in the rotor element of the applicants' design and are ineffective at the extremely high rotor speeds.

SUMMARY

The applicants' invention pertains to a fluid driven, gas bearing handpiece utilizing a unique design to allow higher speeds and greater torque to be applied to the rotor element. In addition, the applicants utilize extreme care in the selection of materials utilized in the design so as to provide a low-cost handpiece which can be sterilized. The applicants' handpiece utilizes a unique collet means to lock the dental burr to the rotor element. All of these features are incorporated into a dental handpiece having a head size which is smaller than any known existing fluid driven gas bearing handpiece.

BRIEF DESCRIPTION OF THE DRAWING

FIGURE 1 is a partial cross sectional view of the applicants' dental handpiece.

DESCRIPTION OF THE PREFERRED EMBODIMENT

Figure 3:
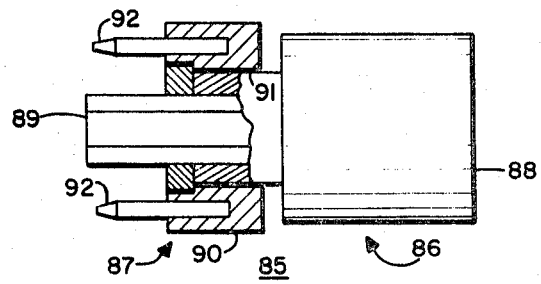
FIGURE 3 is a partial cross sectional view of the collet wrench means.

Referring now to FIGURE 1, reference numeral 10 generally depicts the applicants' dental handpiece including a head element 11 and handle means 12. Head element 11 includes a housing means 15 having a generally cylindrical bore 16 therethrough.

Rotor means 20 includes a tubular shaft 21 having an enlarged radius section 22 centrally positioned thereon. Enlarged radius section 22 has a plurality of turbine buckets 25 machined on the periphery thereof. Shaft 21 has a conical surface 24 on either side of enlarged radius section 22. Shaft 21 of rotor means 20 has an opening 26 therethrough. One end of opening 26 is threaded as at 27.

Collet means 30 are positioned within the opening 26 of tubular shaft 21 and adapted to lock a dental burr to the shaft for rotation therewith. Collet means 30 comprises the stationary taper element 31 rigidly attached to shaft 21 at one end of opening 26. One end of stationary taper element 31 has a tapered surface 32 thereon. It should be pointed out that tapered surface 32 and taper element 31 can be integral with shaft 31 and need not be a separate element. A collet body 33 having a tapered surface 34 at each end thereof is positioned contiguous to stationary taper 31 in opening 26. Tapered surface 32 and tapered surface 34 are both inclined to axis 39 of rotor means 30 at substantially the same angle. Collet body 33 has a plurality of longitudinal slots 35 in each end thereof so as to form a plurality of jaws 36 at each end of the collet body. Collet body 33 is slideable along axis 39 in opening 26 with respect to shaft 21. A moving taper element 37 having a tapered surface 38 on one end thereof is positioned contiguous to collet body 33. Tapered surface 38 and tapered surface 34 are inclined with respect to axis 39 at substantially the same angle. Movable taper element 37 is slideable along axis 39 within opening 26 relative to shaft 21. A driving member 40 is positioned contiguous moving taper element 37 and is threadably engaged at 27 with shaft 21. Driving member 40 contains a hexagonal socket 41 therein adapted to receive the end of a suitable wrench (see FIGURE 3).

Stationary taper element 31 and collet body 33 contain a central aperture therein adapted to receive the shaft of a dental tool (not shown). Rotation of driving member 40 relative to shaft 21 by suitable wrench means causes driving member 40 to be axially displaced along axis 39 relative to shaft 21. When driving member 40 is displaced towards stationary taper 31 it forces tapered surface 38 of moving taper element 37 against taper 34 of collet body 33. It also forces tapered surface 34 on the other end of collet body 33 against taper 32 of stationary taper element 31. Thus jaws 36 are forced radially inward towards axis 39 thereby gripping the dental tool positioned in the aperture in collet body 33. Axial displacement of driving member 40 in the opposite direction releases the dental tool from collet 33.

Bearing means 50 are provided to support rotor means 20 for rotation about axis 39 relative to housing means 15. Bearing means 50 comprises an upper bearing means 51 and a lower bearing means 52 positioned on either side of enlarged radius section 22 of rotor means 20. Upper bearing means 51 and lower bearing means 52 are identical and only upper bearing means 51 will be described in detail.

Upper bearing means 51 includes a cylindrical bearing pad 53 having an enlarged radius portion 54 centrally located thereon. Bearing pad 53 has a central conical aperture therethrough defining a supporting surface 55. Bearing pad 53 is positioned within bore 16 of housing means 15 so that supporting surface 55 is parallel to and spaced apart from conical surface 24 of rotor means 20. An O-ring 56 is positioned between housing means 15 and bearing pad 53 on either side of enlarged radius section 54. The lower O-ring as viewed in FIGURE 1 is positioned between enlarged radius portion 54 and a shoulder 17 of housing means 15. It should be noted that O-ring 56 does not completely fill the space between enlarged radius portion 54 and shoulder 17 but does contact both housing means 15 and bearing pad 53 forming an air tight seal therebetween. The upper O-ring as viewed in FIGURE 1 is positioned between enlarged radius portion 54 and a bushing 57 rigidly attached to housing means 15. Upper O-ring 56 does not completely fill the space between bushing 57 and enlarged radius portion 54 but does contact both housing means 15 and bearing pad 53 forming an air tight seal therebetween.

Bearing pad 53, O-rings 56 and bushing 57 are held in position by an end cap 60 threadably engaged to housing means 15. Bearing pad 53 is thus resiliently mounted on housing means 15 by O-rings 56 which allow a limited rotational and translational movement thereof relative to the housing means. More specifically, bearing pad 53 has limited freedom along axis 39 and about an axis perpendicular to the plane of the drawing (FIGURE 1). This allows bearing pad 53 to follow the rotor means 20 when the rotor is subjected to side loading and precludes surface contact between the rotor means and the bearing pad. This resilient mounting of bearing pad 53 is also effective to suppress the half speed whirl phenomenon of the gas bearing. The O-rings 56 are fabricated out of a high temperature material, such as Buna-N, which retains its resiliency after being subjected to temperatures of approximately 270° F.

Figure 2:
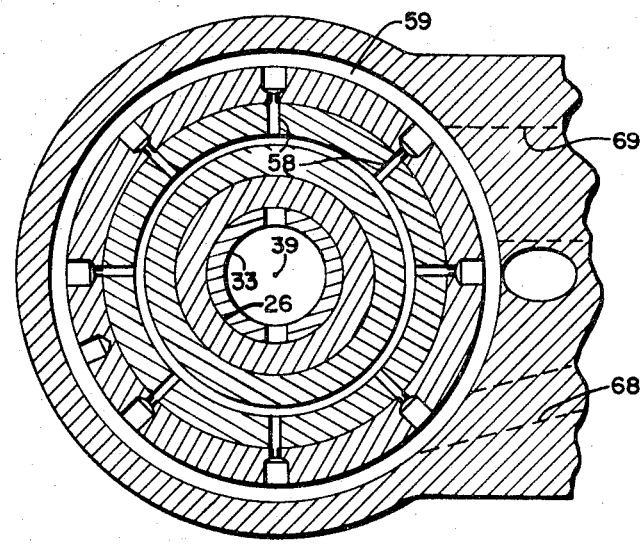
FIGURE 2 is a cross sectional view taken along line 2—2 of FIGURE 1.

Bearing pad 53 also has a plurality of radial passages 58 therethrough as best illustrated in FIGURE 2. Passages 58 are equally angularly spaced about axis 39 and are in communication at one end with the space between support surface 55 and conical surface 24 of rotor means 20. The other end of passage means 58 is in communication with annular manifold groove 59 in bearing pad 53.

End cap 60 has a central opening 61 and two wrench openings 62 therethrough. Rotor means 20 has two wrench receiving openings 63 therein aligned with apertures 62 of end cap 60.

Passage means 74 are provided in head element 11 to supply fluid to bearing means 40. Passage means 74 includes an annular chamber 64 formed between housing means 15, annular groove 59 of bearing pads 53 and O-rings 56. Chamber 64 is completely sealed by O-rings 56 even though the O-rings allow translational and rotational movement of bearing pad 53. Passage means 74 also includes a main supply passage 65. Passages 66 and 67 are in fluid communication with supply passage 65 and direct fluid to upper and lower bearing means 51 and 52. Passage 66 supplies fluid to annular chamber 64. The fluid flows from chamber 64 through passages 58 and coacts with conical surface 24 of rotor means 20 and supporting surface 55 of bearing pad 53 to provide both radial and axial support for rotor means 20.

A nozzle 68 is provided in head 11 to direct fluid from supply passage 65 to turbine buckets 25 on rotor means 20. An exhaust passage 69 is also provided in head 11.

A cooling manifold 70 is attached to housing means 15 at one end of bore 16 by means of a press fit. Manifold 70 has a central opening 71 therethrough to allow a dental burr to be positioned in collet means 30. Manifold 70 has a plurality of orifices 72 therein which are supplied with water and air or a mixture thereof from passage 73.

Wrench means 85 is illustrated in FIGURE 3 and includes a torqueing element 86 and mounting means 87. Torqueing element 86 comprises a handle 88 having an hexagonal shaft 89 rigidly attached thereto. Mounting means 87 comprises an annular collar 90 having an opening 91 therethrough and a pair of elongated pins 92 rigidly attached to the collar. Torqueing element 86 extends through opening 91 and is mounted upon mounting means 87 for rotation relative to collar 90.

In operation, the dental tool is positioned within the aperture of collet means 30. Wrench means 85 is positioned adjacent to end cap 60 with pins 92 extending through openings 62 and projecting into wrench receiving openings 63 in rotor means 20. This prevents rotation of rotor means 20 relative to housing means 15. Shaft 89 extends through central opening 61 and projects into hexagonal socket 41 in drive means 40 of collet means 30. Rotation of handle 88 of wrench means 85 causes driving means 40 to rotate relative to shaft 21 of rotor means 20 because of the threaded engagement therebetween and to move longitudinally along axis 39. When handle 88 of wrench means 85 is rotated in a clockwise direction about axis 39, driving means 40 moves axially towards stationary taper 31. This causes sliding taper 37 to force collet body 33 against stationary taper 31. Tapered surfaces 32, 34, and 34–38 operate to force jaws 36 at each end of collet body 33 to firmly grip the dental tool and hold it locked relative to rotor means 20.

Passage means 73 supplies fluid to bearing means 50 when supply passage 65 is connected to a suitable source of high pressure gas (air). Approximately five percent of the air flowing through passage 65 flows through each of passages 66 and 67 to upper bearing 51 and lower bearing 52. The fluid flowing through passage 66 flows into annular chamber 64 and then through passages 58 to the space between conical surface 24 of rotor means 20 and conical surface 55 of bearing pad 53 so as to provide radial and axial support for rotor element 20. A portion of the gas flowing through passages 58 exhausts through openings 61 and 62 in end cap 60. A portion of the fluid flowing through conduit 67 to lower bearing means 52 exhausts through the clearance between opening 71 in cooling manifold 70 and the dental tool. The remaining fluid from passages 66 and 67 exhaust through exhaust conduit 69 back through handle 12. Approximately 90 percent of the air flowing through conduit 65 flows through nozzle 68 and impinges upon turbine buckets 25 causing rotor means 20 to be rotated at approximately 500,000 r.p.m. about axis 39. The air suppled to turbine buckets 25 exhausts through exhaust passage 69.

Fluid passage 73 is connected to a suitable fluid source such as water or air or a mixture thereof which is directed out of orifices 72 so as to cool the dental tool.

Thus the applicants have provided an improved dental handpiece that is smaller in size yet provides higher speed and greater torque to rotor means 20 to allow instantaneous start up and greater bulk removal characteristics. Unique collet means are provided to lock the dental tool to the rotor means.

Although the invention has been described and illustrated in detail it is to be clearly understood that the same is by way of illustration and example only and is not to be taken by way of limitation, the spirit and scope of this invention being limited only by the terms of dependent claims.

What is claimed is:
1. A dental handpiece comprising:
 a head element, said element including
  housing means having a bore therethrough extending along a first axis;
  rotor means including a tubular shaft having a conical surface on either side of an enlarged radial portion, said rotor means being positioned within said bore of said housing means;
  collet means positioned within the opening of said tubular shaft, said collet means including a collet body having an aperture therethrough positioned contiguous to a stationary taper on said shaft, said collet body being slideable with respect to said shaft and having a plurality of jaws at each end thereof, said collet means further including a moving taper element positioned contiguous to said collet body and slideable with respect to said shaft, a driving member positioned contiguous said moving taper and threadably engaged with said shaft, and means for rotating such driving member relative to said shaft so as to axially displace said driving member relative to said shaft;
  bearing means including a bearing pad positioned within said bore of said housing means on either side of the enlarged radius portion of said rotor means, each bearing pad being resiliently mounted upon said housing means by means of O-rings for limited movement along said first axis relative to said housing, and limited movement transverse to said first axis relative to said housing, each bearing pad having a conical aperture therethrough defining a supporting surface, each bearing pad having a plurality of radial passages therein in fluid communication with the space between said supporting surface and said conical surface of said rotor means;

passage means contained within said head element, said passage means including nozzle means adapted to direct a fluid to impinge upon said enlarged radius section of said rotor means so as to rotate said rotor means relative to said housing means, said passage means further including passages in fluid communication with said radial passages;

cooling manifold means attached to said housing means at one end of said bore;

an end cap attached to said housing at the other end of said bore; and handle means rigidly attached to said head element, said handle means having conduit means therein for supplying fluid to said passage means and said manifold means.

2. The dental handpiece of claim 1 wherein said collet means includes a stationary taper element rigidly attached to said shaft at one end of the opening therein.

3. The dental handpiece of claim 1 wherein each bearing pad is resiliently supported within said housing by a pair of O-rings.

References Cited

UNITED STATES PATENTS

| | | | |
|---|---|---|---|
| 2,249,058 | 7/1941 | Staunt | 32—26 |
| 3,268,205 | 8/1966 | Allen et al. | 32—27 XR |
| 3,380,162 | 4/1968 | Hezthe | 32—27 |

ROBERT PESHOCK, Primary Examiner

U.S. Cl. X.R.

253—2